No. 875,799.
PATENTED JAN. 7, 1908.
O. O. GILBERT.
PROPELLER.
APPLICATION FILED FEB. 8, 1904.
2 SHEETS—SHEET 1.
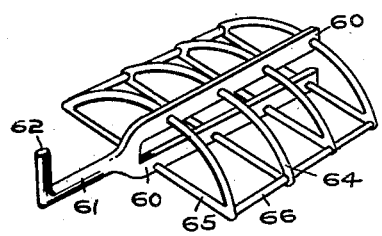
Fig. 6.
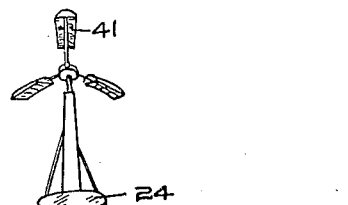
Fig. 1.
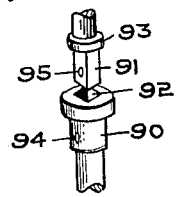
Fig. 7.
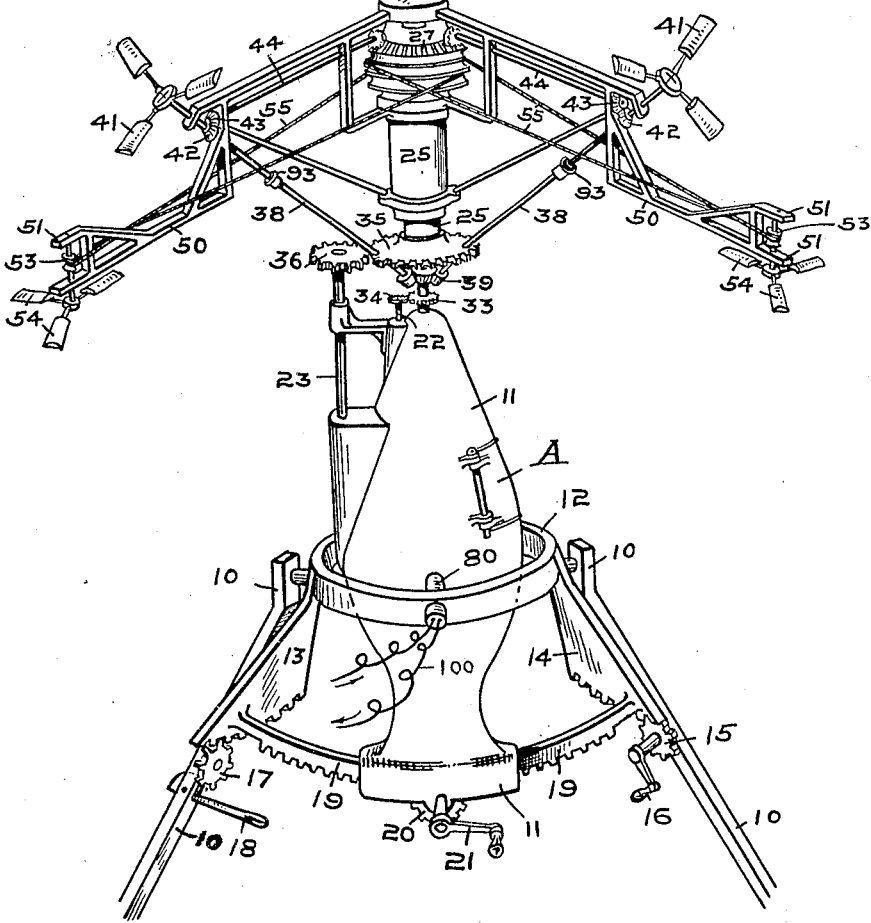
Witnesses
F. W. Woerner.
L. B. Woerner.
Inventor
Oscar O. Gilbert.
By James A. Walsh,
Attorney No. 875,799.
PATENTED JAN. 7, 1908.
O. O. GILBERT.
PROPELLER.
APPLICATION FILED FEB. 8, 1904.
2 SHEETS—SHEET 2.
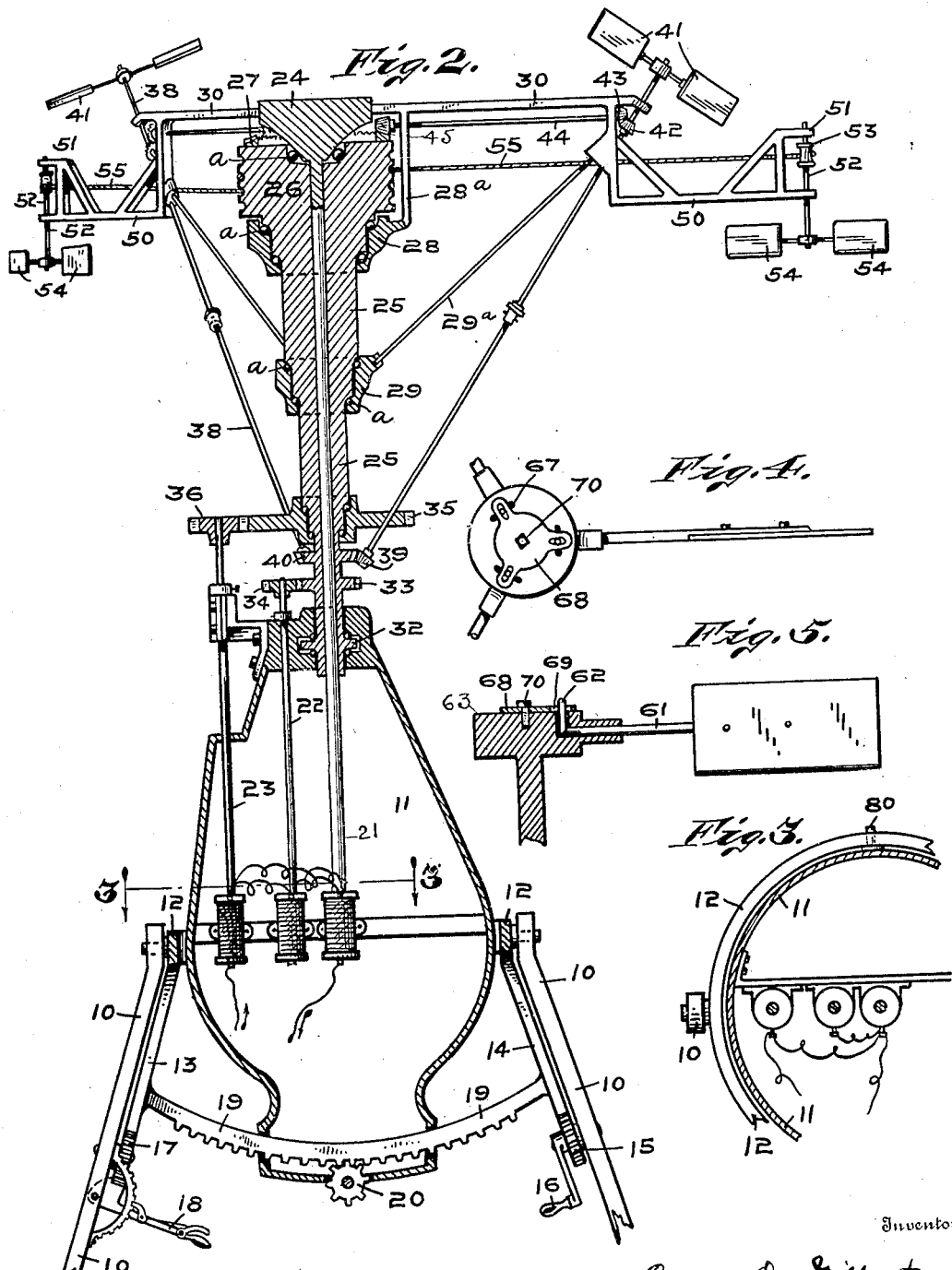
Witnesses
F. W. Woerner.
L. B. Woerner.
Inventor
Oscar O. Gilbert.
By James A. Walsh,
Attorney

UNITED STATES PATENT OFFICE.

OSCAR O. GILBERT, OF SAN FRANCISCO, CALIFORNIA.

PROPELLER.

No. 875,799.  Specification of Letters Patent.  Patented Jan. 7, 1908.

Application filed February 8, 1904. Serial No. 192,657.

*To all whom it may concern:*

Be it known that I, OSCAR O. GILBERT, a citizen of the United States, residing in the city and county of San Francisco and State of California, have invented certain new and useful Improvements in Propellers, of which the following is a specification.

The object of my present invention is to produce an apparatus adapted to be employed in connection with movable bodies for propelling the same, and which is especially applicable to vehicles designed for aerial navigation; and which may also be employed in manufacturing or other establishments for creating air blasts.

Said invention will be first fully described, and the novel features thereof then pointed out in the claims.

The accompanying drawings illustrate my invention.

Figure 1 is a perspective view of my device; Fig. 2 a central vertical sectional view thereof; Fig. 3 a horizontal sectional view on the dotted line 3 3 in Fig. 2; Fig. 4 a plan view of the bearing for the propeller blades; Fig. 5 a central vertical sectional view thereof; Fig. 6 a perspective view of the framework of the propelling blades; and Fig. 7 a perspective view of the shaft couplings which I employ.

This apparatus as illustrated contemplates its employment in connection with craft designed for aerial navigation; and although but a limited number of sets of propelling blades are shown, it will be understood that as many may be employed as may be found desirable.

The structure as a whole is supported in an appropriate body for the reception of an operator, to which body is secured suitable standards, as 10. The main casing 11 which contains the motors, or other driving means, is pivotally mounted, by suitable trunnions, in an annular collar 12, which collar in turn is pivotally mounted in said standards 10. Collar 12 is provided at opposite sides with segmental toothed members 13, 14, the teeth of which member 14 engage with and are operated by a pinion 15 provided with a crank 16 by which the collar 12 is tilted backward and forward. The member 13 engages with the pinion 17 secured to standard 10, and is provided with a locking device 18, so that when the collar 12 is operated by the crank 16, the same may be held in the desired position by said locking device. The two members 13 and 14 are connected by the segmental rack-bar 19 which engages with the tail end of the casing 11, having mounted therein a pinion 20 operated by the crank 21, the pinion 20 engaging with the rack bar 19 whereby lateral movement is imparted to casing 11.

The casing 11 is adapted to contain suitable driving mechanism for driving the shafts 21, 22, 23, and is provided with a suitable door A for access to said driving mechanism. The main shaft 21 is provided at its upper end with a cap-piece 24, and surrounding said shaft is a casing 25 bearing a grooved driving drum 26 carrying an annular toothed gearing 27 on its upper side. This casing is surrounded by ball bearing revoluble collars, 28, 29, which collars or bearings, in connection with cap 24, serve to hold and support the various parts 28ª, 29ª, and 30, which constitute the upper framework of the structure. As will be observed, I provide ball bearings *a* for the collars, etc., by which friction is reduced to a minimum. The lower end of said casing 25 is provided with the integral collar 32, nesting in the upper portion of the casing 11. The part 33 of said casing 25 is in the form of a driving gear, which meshes with gear 34 on the upper end of shaft 22.

Surrounding casing 25 is a gear wheel 35 which meshes with gear 36 on the upper end of shaft 23, which shaft is supported in a suitable bearing secured to the casing 11. Shafts 38 pass through supporting bearings in gear 35, and are provided at their lower ends with small miter gears 39 meshing with the gearing 40 on casing 25. These shafts extend at an angle through gear 35 and the upper framework, and are supported thereby, and at their upper ends carry the fans composed of the blades 41, and the mechanism in which they are supported, said shafts being provided with gear 42 meshing with the gear 43 on the ends of shafts 44 which are supported in the framework and provided with gear 45 at the opposite end which meshes with wheel 27 on the driving drum.

Shafts 38, for purposes of assemblage with the framework, are preferably of two pieces, the meeting ends whereof are provided with a simple and efficient coupling 90, 91, (Fig. 7) the members 90 containing socket 92 to receive the end 91 which is provided with stop collar 93, which enables these parts to be properly positioned so that the holes 94, 95, therein register with each other to receive a suitable pin for securing the coupling together, as will be readily understood. This coupling also enables me to disconnect the lower portions of these shafts if desired. When this is done, as will be readily understood, the power for driving the upper portion of these shafts will be transmitted through shafts 44.

The various members composing the framework are suitably constructed and attached, and I have illustrated portions 50 thereof as extending below and beyond the parts which support the fan carrying shafts 38, which portions 50 terminate in suitable bearings 51 to support the shafts 52 carrying the spools 53 which operate the fan blades 54; the power for driving said blades being transmitted by the endless ropes 55 wound about the grooved driving drum 26 and running around the spools 53 on shaft 52.

I do not wish to be understood as limiting myself to the exact construction of framework illustrated, nor the location of the fans exactly as set forth, for, as will be apparent, if desired, I may dispense with the use of the structure 50 and the portions of the framework supporting said structure, or may locate these blade structures at different parts of the framework. It will also be understood that in a propeller of this class an orbital motion is given to its several individual propellers or fans by an axle rotating a frame which carries several individual propellers or fans, each having two or more blades, and each individual propeller or fan having a rotary motion, the same primary power which creates this orbital motion also producing a rotary motion of the individual blade or fan structures; and, therefore, this dual motion of the mechanism arranged as described develops a highly effective resistance from the air which will produce a levitating and driving power, increased or decreased according to the rapidity of these dual motions.

The propelling blades of my device, as shown in Fig. 6, are composed of the substantially U-shaped main frame 60, terminating in the shank 61 having its end bent so as to form the right angle member 62, by which the blade structure is adjustably positioned in the housing 63, as shown in Fig. 5. Curved and straight ribs 64 and 65 preferably pass through the members 60 of the blade framework and are braced together by the parts 66. To this framework I secure fabric or other suitable material, which structure as a whole constitutes my improved blade. As shown in Figs. 4 and 5, these blades are adjustably secured in the housing 63, the ends of members 62 being seated in and their ends projecting through slotted openings 67 in housing 63. Cap 68, containing perforations 69, is placed thereover, which perforations receive the projecting ends of members 62, said cap being movably held in position by screw 70. Several blades being mounted in each housing uniformity of position of each is maintained by the simple mechanism mentioned, for, as will be readily understood, the turning of one blade will cause the cap-piece to slightly turn, throwing all of the blades uniformly and simultaneously in the direction of its travel.

In the operation of this apparatus when employed with aerial craft, it will be understood that, its base portion being pivotally mounted as shown, when tipped to any desired position, the bed containing the operator is maintained in horizontal position. By properly manipulating crank 21 the lower end of the casing is caused to travel laterally across bar 19, the upper frame structure tipping in the opposite direction the trunnions 80 mounted in collar 12, maintaining said casing in steady position; said trunnions and collar being provided with apertures to receive electric, compressed air, or other conductors, 100, connecting with the driving mechanism in the interior of casing 11. The structure as a whole can also be tilted forward and backward by manipulation of crank 16. By this arrangement of mounting the casing it, together with the parts carried thereby, can be given a lateral, forward and backward tilt, and is capable of being so tilted not only in vertical but laterally inclined position as well.

The main driving shaft which carries the cap for supporting the upper framework is driven, revolving said frame structure and the parts connected therewith, causing shafts 44 whose gearing 45 mesh with wheel 27 to revolve, and at the same time shafts 38 which mesh therewith and with gearing 40, the revolution of shafts 38 causing rapid rotation of the propeller blades 41. While this structure is rotating about the casing 25, the endless ropes running around drum 26 and around spools 53, cause rapid revolution of blades 54. Whenever altered rotary motion of the individual fans or propellers, represented by blades 41 and 54 with their housings, may be desired without altering the orbital motion of said fans as controlled by main shaft 21, such altered rotary motion may be had by placing in action the power driving the driving shaft 22 with gearing 34, 33, and casing 25. As will be understood, if casing 25 is rotated reversely to main shaft 21 the rotary motion of the individual fans will be accelerated, and if conversely this motion will be decreased. The rotation of the structure carried by shaft 21 may be assisted by the operation of shaft 23 through the gear carried thereby meshing with gear 35. This however is not absolutely essential, but I prefer to provide it for use in case of disablement of the main driving mechanism, this auxiliary driving mechanism being capable of driving the structure to a certain degree.

By my construction I obtain a rapid revolution of oppositely positioned sets of blades, as well as an orbital motion thereof, while by mounting the structure as above described I am enabled to incline or dip it at any desired angle. When employed with existing aerial craft these propeller structures can be attached by suitable couplings fore and aft or other desired location; or they may be housed in such craft to be released therefrom by suitable mechanism, all as will be readily understood.

I claim as my invention:

1. In a propeller, the combination, with suitable supporting means, a collar pivotally mounted therein, segmental members at opposite sides of said collar, means for shifting said segmental members and thus tilting said propeller back and forth, a rack-bar supported by said members, a casing pivotally mounted in said collar the lower end of said casing engaging with said rack-bar, and actuating means engaging the lower end of said casing and said rack-bar for moving said lower end along said bar and thus tilting the propeller laterally.

2. A propeller comprising a main casing propeller blades supported by said casing, driving mechanism therein, a collar, said casing being pivotally mounted in said collar and said collar being mounted in standards, the lower end of said casing engaging with a rack-bar, means for conducting the lower end of said casing across said rack-bar, and means for tilting said casing backward and forward, as set forth.

3. In a propeller, the combination, with a suitable support, of a collar pivotally connected therewith, segmental toothed members on opposite sides of said collar and connected therewith, a rack-bar connecting said members, an inclosing casing for driving mechanism pivotally mounted in said collar the lower end of which casing engages said rack-bar, a driving shaft mounted in and extending through said casing, means for driving said shaft, a cap at the upper end of said shaft, a tubular casing surrounding said shaft, collars surrounding said casing, a framework supported by said cap and said collars, and blades operably mounted in said framework, all substantially as and for the purpose set forth.

4. In a propeller, the combination with a suitable support, of a collar pivotally connected therewith, segmental toothed members on opposite sides of said collar and connected therewith, a rack-bar connecting said members, an inclosing casing for driving mechanism pivotally mounted in said collar the lower end of which casing engages said rack-bar, a driving shaft mounted in and extending through said casing, means for driving said shaft, a cap at the upper end of said shaft, a tubular casing surrounding said shaft, collars surrounding said casing, a framework supported by said cap and said collars, blades operably mounted in said framework, a gear as 33 and a supporting collar as 32 secured to said casing and said collar engaging said inclosing casing, and a driving shaft as 22 provided with a gear 34 meshing with gear 33, for the purpose set forth.

5. In a propeller, the combination, of a suitable support, a rack-bar, a pivotally mounted collar, a casing pivotally mounted in said collar and engaging with said rack-bar, means for moving the lower end of said casing along said rack-bar, driving means in said casing, a main driving shaft connected to said driving means and extending through said casing, a cap on said shaft, a casing surrounding said shaft, a framework carrying a plurality of propelling blades supported by said cap and said last mentioned casing, a gear 33 on said casing, and a drive shaft 22 provided with gear 34 meshing with said gear 33, substantially as set forth.

6. In a propeller, the combination of a suitable support, a rack-bar, a pivotally mounted collar, a casing pivotally mounted in said collar and engaging with said rack bar, means for moving the lower end of said casing along said bar, motors in said casing, a main driving shaft supported in and extending through said casing, a cap on said shaft, a casing surrounding said shaft, a framework carrying a plurality of propelling blades supported by said cap and said last mentioned casing, a gear wheel as 35 surrounding said casing, a shaft 23 having a gear 36 thereon engaging said gear-wheel, a gear 33 on said casing, and a drive shaft 22 provided with a gear 34 engaging with said last mentioned gear, substantially as set forth.

7. In a propeller, the combination of a motor containing casing, a driving shaft supported in and extending therethrough, a cap on the upper end of said shaft, a framework connected to said cap, a series of blades operably connected to said framework, a casing surrounding said shaft, and a gear wheel 35 surrounding the casing for transmitting motion to the blades, for the purpose set forth.

8. In a propeller, the combination of a motor containing casing, a driving shaft supported in and extending therethrough, a cap on the upper end of said shaft, a casing surrounding said shaft, a gear surrounding said casing, a shaft 23 supported in said casing and having a gear at its upper end meshing with said first-mentioned gear, a series of inclined shafts extending through the first mentioned gear and the upper part of the framework, and gear carried by said shafts, for the purpose set forth.

9. In a propeller, the combination of a motor containing casing, driving mechanism inclosed by said casing, a driving shaft operably connected with said driving mechanism and extending through said casing, a cap on the upper end of said shaft, a casing surrounding said shaft, a gear 35 surrounding said casing, bearings provided in said gear, a series of shafts passing through said bearings, gears on the lower ends of said shafts, a gear 40 carried upon the lower end of said casing and engaging said gears to transmit motion to said shafts, and a series of blades operably connected to said shafts.

10. In a propeller, the combination of a motor containing casing, supporting means therein for the motor, a tubular casing engaging with said motor containing casing, a driving shaft in said tubular casing and operably connected in said motor containing casing, a cap on said driving shaft, a blade supporting framework connected to said cap, an auxiliary driving shaft 22 operably connected with said tubular casing, said auxiliary shaft rotating said tubular casing in a direction opposite to that of said main driving shaft for the purpose set forth.

11. In a propeller, the combination of driving mechanism, a main driving shaft connected therewith, a cap on the upper end of said shaft, a framework carrying blades connected to said cap, a casing surrounding said shaft, a driving drum on the upper end of said casing, power transmitters communicating motion from said drum to the outer sets of blades on said framework, an annular toothed wheel on said drum, shafts 44 having a gearing meshing with said toothed wheel said shafts being mounted in said framework, a gearing 40 on said casing, and shafts 38 provided with blades engaging with said shafts 44 and said gear 40 for the purpose set forth.

12. In a propeller, the combination of a main driving shaft, a cap carried thereby, a casing surrounding said shaft, collars surrounding said casing, a framework carrying blades supported by said cap and said collars, a driving drum on the upper end of said casing, power transmitters communicating motion from said drum to the outer sets of blades 54 on said framework, inclined shafts having blades thereon engaging said casing and supported in said framework, and mechanism for revolving the casing and driving shaft in opposite directions.

13. In a propeller, the combination with a suitable base, of a collar, a motor containing casing supported by said collar, driving mechanism within said casing, flexible power conductors communicating with said driving mechanism from without said casing, a driving shaft supported in said casing and extending therethrough means for driving said shaft, a cap at the upper end of said shaft, a tubular casing surrounding said shaft and positioned intermediate said motor containing casing and said cap, a framework carrying a plurality of blades supported by said tubular casing and said cap, and means for driving said tubular casing in an opposite direction from the main driving shaft, for the purpose set forth.

14. In a propeller, a blade comprising a substantially U-shaped member having a shank terminating in a right angled member, ribs mounted in said member and forming therewith a framework, and fabric secured to said framework, for the purpose set forth.

In testimony whereof, I have signed my name to this specification in the presence of two subscribing witnesses.

OSCAR O. GILBERT.

Witnesses:
  M. L. REID,
  ADDIE L. BALLOU.